July 8, 1958
B. H. SHORT
2,842,334
CONTROL DEVICE
Filed March 15, 1954
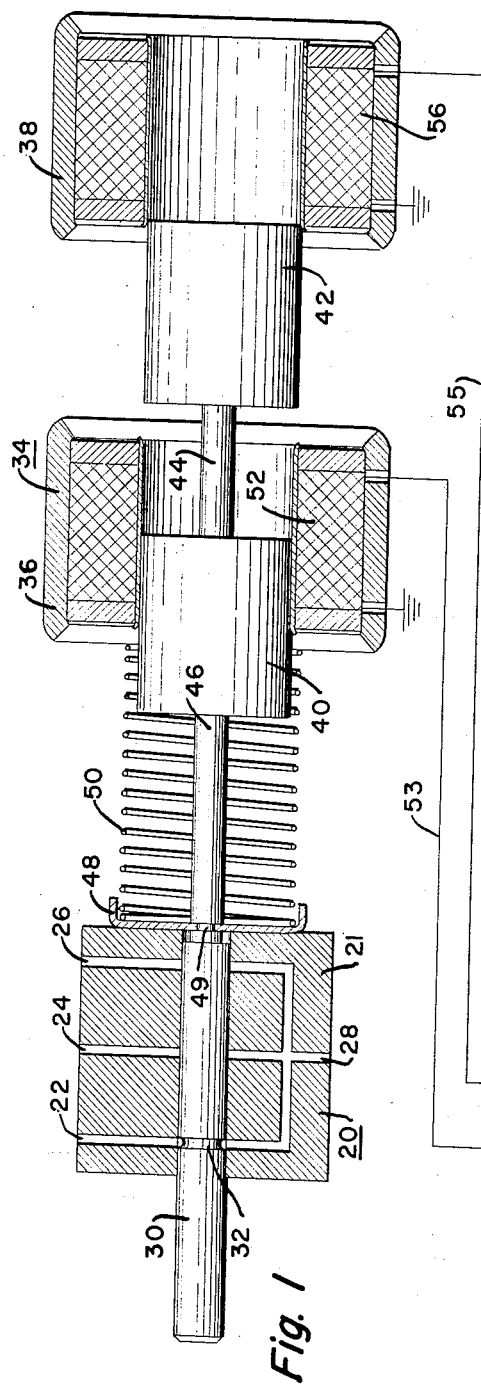
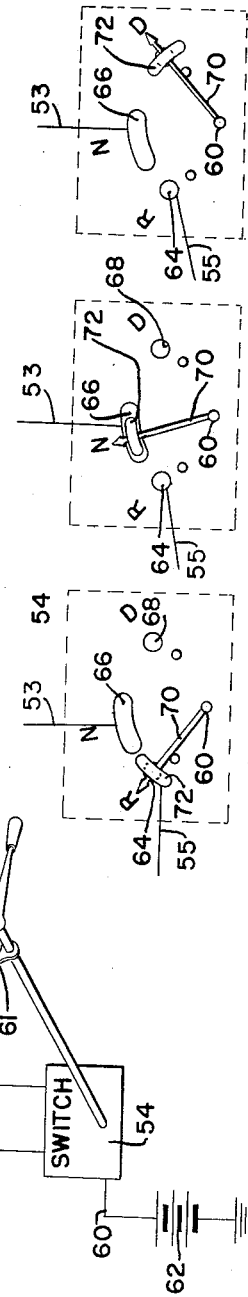
INVENTOR.
Brooks H. Short
BY
His Attorney

United States Patent Office 2,842,334
Patented July 8, 1958

2,842,334
CONTROL DEVICE

Brooks H. Short, Anderson, Ind., assignor to General Motors Corporation, Detroit, Mich., a corporation of Delaware Application March 15, 1954, Serial No. 416,342

3 Claims. (Cl. 251—137)

This invention relates to a control device and is particularly concerned with a magnetically controlled actuator for a hydraulic control system.

One of the objects of the present invention is to provide a hydraulic control with a magnetic actuator which may be selectively energized for moving said hydraulic control to any one of a plurality of positions of control.

Another object of the invention is to provide a control system including a device to be controlled wherein a controller is used which is movable in one direction to three different positions of control, means being provided for moving the controller selectively to any one of said positions of control at the option of the operator.

A still further object of the invention is to provide a control system including a controller such as a hydraulic valve, wherein an actuator comprising two magnetically operated devices is used to move the controller, said magnetically operated devices being adapted to be selectively energized at the option of an operator for moving the controller to desired selected positions.

In carrying out the above object it is a further object to utilize two aligned solenoids operating on a tandem armature wherein the first solenoid moves the armature a predetermined distance when energized and wherein the second solenoid is adapted to be energized conjointly with the first solenoid to move the armature to a second predetermined position.

Further objects and advantages of the present invention will be apparent from the following description, reference being had to the accompanying drawing, wherein preferred embodiments of the present invention are clearly shown.

In the drawing:

Fig. 1 shows a hydraulic control valve together with a pair of solenoids for actuating the valve, said solenoids being diagrammatically connected to a switch operated by a selector lever.

Fig. 2 is an enlarged view showing the switch shown in Fig. 1 in one position of control.

Fig. 3 is a view showing said switch in a second position of control.

Fig. 4 is a view showing said switch in a third position of control.

In hydraulic control systems, it is desirable to have a valve which is movable to a plurality of positions for connecting various ducts selectively at the option of the operator. This is particularly true in hydraulic control systems for automatic transmissions and the like. In this connection, the various hydraulic hookups are determined by the position of the selector lever normally carried by the steering column of an automotive vehicle. Such automatic transmissions may be selectively operated to accomplish reverse (R), neutral (N) or forward driving (D) conditions of the vehicle by moving the lever to a desired position.

The present invention is directed to a hydraulic control valve and an actuator therefor which may be used in connection with any hydraulic control system but which is particularly applicable for use in connection with hydraulic control systems used in connection with automatic transmissions and the like.

Referring to the drawing, Fig. 1 shows diagrammatically a hydraulic control valve 20 which includes a body 21 having three outlet ducts 22, 24 and 26 therein, all connected to a single inlet duct 28. A piston 30 is provided having a bypass ring or groove 32 thereon which, when moved into alignment with ducts 22, 24 and 26, selectively connects these ducts with the inlet duct 28.

In order to move the piston 30 to the desired position, a controller device 34 is provided which includes two aligned solenoids 36 and 38 suitably mounted in spaced permanent relation to the valve 20. Solenoids 36 and 38 have aligned armatures 40 and 42 connected in tandem by rod 44, which combined armatures are connected by rod 46 to the piston 30. In order to normally maintain the piston 30 in one position, for example, the drive position as indicated, a plate 48 is carried in a groove 49 on the rod 46, which plate is urged against the body 21 of the valve 20 by a spring 50 which is under compression between the plate 48 and the body of solenoid 36. Thus, it is apparent that when no current is passing through either of the solenoids 36 and 38, the piston 30 will be yieldably held in the position shown in Fig. 1 by the spring 50. The winding 52 of the solenoid 36 is connected at one side thereof by wire 53 to the switch 54 while the other side of the winding 52 is grounded. Similarly, one side of the winding 56 of solenoid 38 is connected by wire 55 to switch 54 while the other side of the winding 56 of the solenoid 38 is grounded. The position of the switch 54 is controlled by a selector lever 58 that is generally mounted on the steering column not shown. The position of the switch relative to the lever is indicated on an indicia plate 59 by means of a pointer 61 attached to lever 58. Switch 54 is connected by means of wire 60 to a battery 62, the other side of which is grounded.

Referring specifically to Figs 2, 3 and 4, the internal structure of the switch 54 is shown in more detail wherein a contact 64 marked "R" indicates reverse, a second elongated arcuate contact 66 marked "N" indicates neutral, while a third contact 68 marked "D" indicates drive. The selector arm 70, controlled by the lever 58, carries an elongated arcuate contact 72 thereon. The contact 64 is connected to wire 55 while the contact 66 is connected to wire 53. The contact 68 is normally dead in the present use of the device.

When it is desired to place the vehicle in neutral so that the transmission is in a neutral position, the shift lever 58 is moved to "N" which moves the selector arm 70 to "N" as shown in Fig. 3. In this position, the solenoid 36 is energized which causes the armature 40 to be drawn toward the right to move the piston 30 so that the groove 32 is in alignment with the duct 24. When it is desired to place the vehicle in reverse, the selector arm 70 is moved to the position shown in Fig. 2, wherein the arcuate contact 72 thereof moves to contact 64. During this movement, the arcuate contact first bridges both contacts 64 and 66 to maintain the position of the piston 30 during switching, after which the arcuate contact 72 is moved into contact with contact 64 only, whereupon the solenoid 34 is deenergized and the solenoid 38 remains energized. In this position, the piston 30 is drawn further to the right so that the groove 32 is now in alignment with the duct 26. When it is desired to place the vehicle in drive condition, the selector arm 70 is moved so that its contact 72 engages contact 68 whereupon both solenoids 36 and 38 are deenergized and the yieldable spring means 50 moves piston 30 to the left so that the groove 32 is in alignment with the duct 22.

The arcuate contacts 66 and 72 are provided so that there is no momentary deenergization of solenoid 36 when moving from neutral to reverse positions, which condition would cause a jerk in the operation of the vehicle.

This system of control is simple and effective and the control means used are relatively inexpensive and free from complicated mechanisms. It is apparent that if a fourth position is desired a third solenoid may be provided and that additional contacts in the switch 54 may be used to obtain the desired functions. It is further to be understood that bridging contacts in the switch during the control changes is preferable to prevent oscillation of the solenoid piston or pistons due to the momentary deenergization of the windings as the switch passes from one position to the other, although in some installations, this condition may not be of any importance and in such instances, the bridging contacts do not necessarily have to be used, this being a matter of choice.

While the embodiments of the present invention as herein disclosed, constitute preferred forms, it is to be understood that other forms might be adopted.

What is claimed is as follows:

1. A control device for a hydraulically-operated transmission, the combination comprising: a three-positioned valve for controlling hydraulic flow of said transmission, a controller connected with said valve and selectively movable to provide three different valve positions, means for yieldably holding said controller in said first position, an actuator for said controller comprising at least two magnetically-operated devices connected to said controller, means adapted in one position to connect the first magnetically-operated device in circuit with a current source for moving the controller to said second position and adapted in another position to initially connect the first and second magnetically-operated devices in circuit with a current source and then to connect only the second magnetically-operated device in circuit with said current source for moving said controller to said third position, said yieldable means returning said controller to said first position when said magnetic devices are de-energized.

2. A control device for a hydraulically operated transmission comprising in combination; a three positioned valve for controlling hydraulic flow of said transmission, an electrical actuator comprising first and second solenoids each having a movable armature mounted on a common shaft, the armature of the first solenoid being normally partially within said first solenoid and the armature for the second solenoid being normally outside said second solenoid, said shaft having an operative connection with said valve and normally being spring biased to hold said valve in the first of said three positions and said armatures in said normal position, a selector lever, electrical means controlled by said selector lever including circuits and switches for selectively energizing said solenoids independently of one another whereby energization of said first solenoid moves said valve to its second position against said spring bias and simultaneously moves the armature of the second solenoid partially within said second solenoid so that upon energization of the second solenoid said valve is moved to its third position of control against said spring bias.

3. A control device for a hydraulically operated transmission comprising, a valve structure including a valve block having an inlet port and three outlet ports and including a piston slidable therein between three positions for selectively connecting said inlet port with said outlet ports, an electrical actuator comprising first and second solenoids each having a movable armature fixed to a common shaft, the armature of the first solenoid being normally partially within said first solenoid and the armature for the second solenoid being normally outside said second solenoid, said shaft having an operative connection with said piston and normally being spring biased to hold said piston in the first of said three positions and said armatures in said normal positions, a selector lever, electrical means controlled by said selector lever including circuits and switches for selectively energizing said solenoids independently of one another whereby energization of said first solenoid moves said piston to its second position against said spring bias and simultaneously moves the armature of the second solenoid partially within said second solenoid so that upon energization of the second solenoid said piston is moved to its third position of control against said spring bias.

References Cited in the file of this patent

UNITED STATES PATENTS

| 2,142,950 | Leoffler | Jan. 3, 1939 |
| 2,620,822 | Peterson | Dec. 9, 1952 |
| 2,628,628 | Hertz | Feb. 17, 1953 |

FOREIGN PATENTS

| 6,753 | Great Britain | of 1885 |
| 483,835 | Great Britain | Apr. 27, 1938 |
| 636,649 | Great Britain | May 3, 1950 |